United States Patent [19]

Tomiyori

[11] Patent Number: 5,305,372
[45] Date of Patent: Apr. 19, 1994

[54] MOBILE UNIT WITH SPEED DIALING FEATURE FOR CELLULAR TELEPHONE NETWORK

[75] Inventor: Yutaka Tomiyori, Tokyo, Japan

[73] Assignee: NEC Corporation, Tokyo, Japan

[21] Appl. No.: 921,728

[22] Filed: Jul. 30, 1992

[30] Foreign Application Priority Data

Jul. 30, 1991 [JP] Japan .................................. 3-190280

[51] Int. Cl.⁵ ............................................ H04M 11/00
[52] U.S. Cl. ........................................ 379/59; 379/58; 379/355
[58] Field of Search ................ 379/58, 59, 354, 355; 455/33.1

[56] References Cited

U.S. PATENT DOCUMENTS

| | | | |
|---|---|---|---|
| 4,674,111 | 6/1987 | Monet et al. .......................... | 379/58 |
| 4,875,230 | 10/1989 | Blair .................................. | 379/58 X |
| 4,945,557 | 7/1990 | Kaneuchi et al. .............. | 379/354 X |
| 5,153,904 | 10/1992 | Coombes et al. ...................... | 379/58 |

FOREIGN PATENT DOCUMENTS 56-25861 12/1981 Japan .

OTHER PUBLICATIONS

NEC Advertisement, "The NEC Cellular Telephone", Apr. 1987.

*Primary Examiner*—Curtis Kuntz
*Assistant Examiner*—George J. Dehling
*Attorney, Agent, or Firm*—Sughrue, Mion, Zinn, Macpeak & Seas

[57] ABSTRACT

A cellular telephone includes a speed dialing memory and a current location memory. International access codes respectively identified by corresponding country codes are stored in an access code memory. An indication of the current location of the telephone is stored in the current location memory. A destination address number is retrieved from the speed dialing memory in response to entry of a speed dialing code through a keypad when a call is originated. The country code of the retrieved number is compared with the stored location indication to detect a match or a mismatch. A first decision is made that the originated call is an International call if a mismatch is detected, or a second decision is made that the cell is domestic if a match is detected. In response to the first decision, an international access code is retrieved from the access code memory corresponding to the stored current location indication and appended to the retrieved address number, and in response to the second decision, the country code of the retrieved address number is replaced with a digit "0".

4 Claims, 3 Drawing Sheets

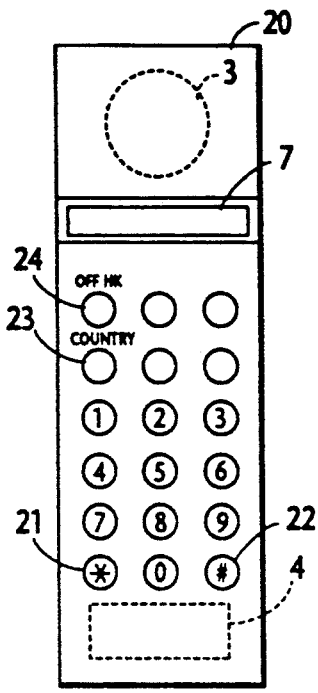
FIG. 2
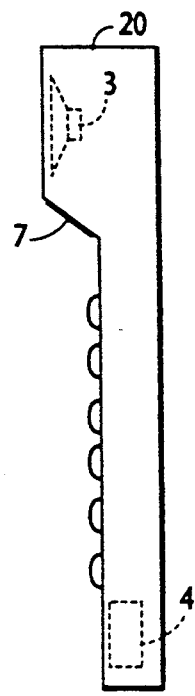
FIG. 3
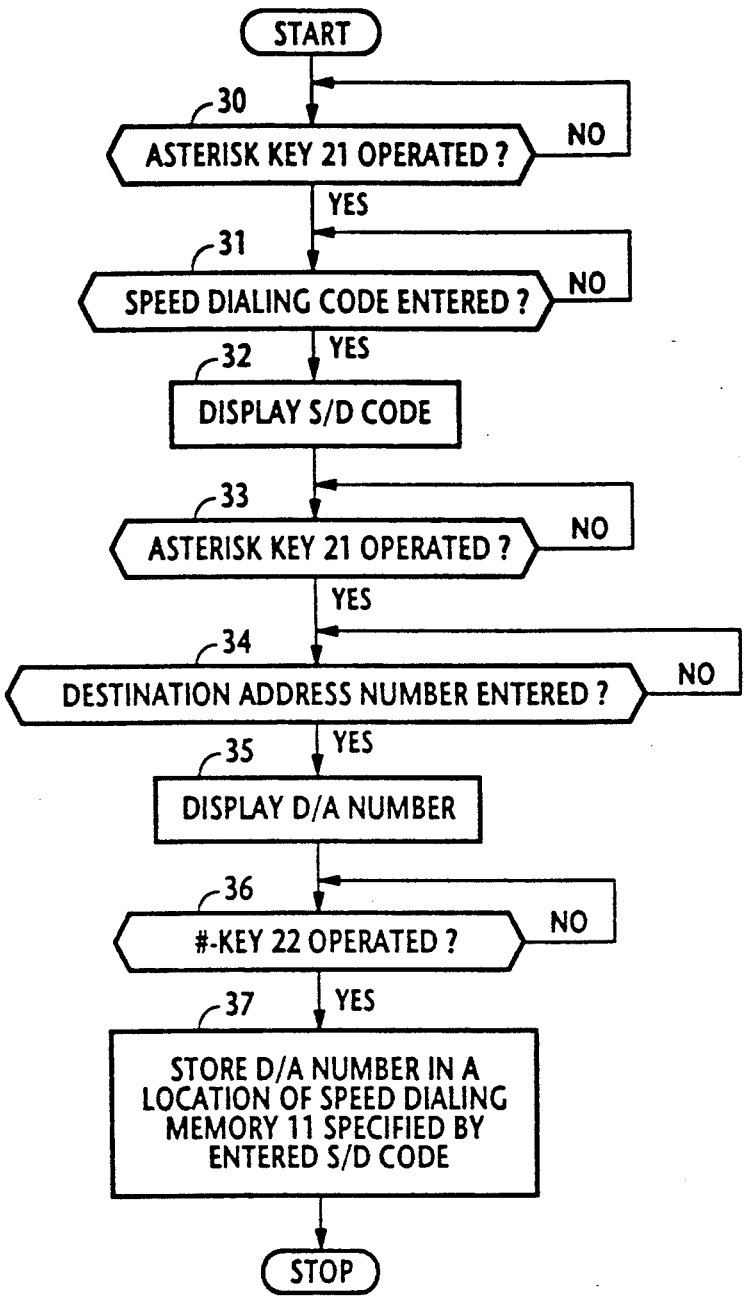

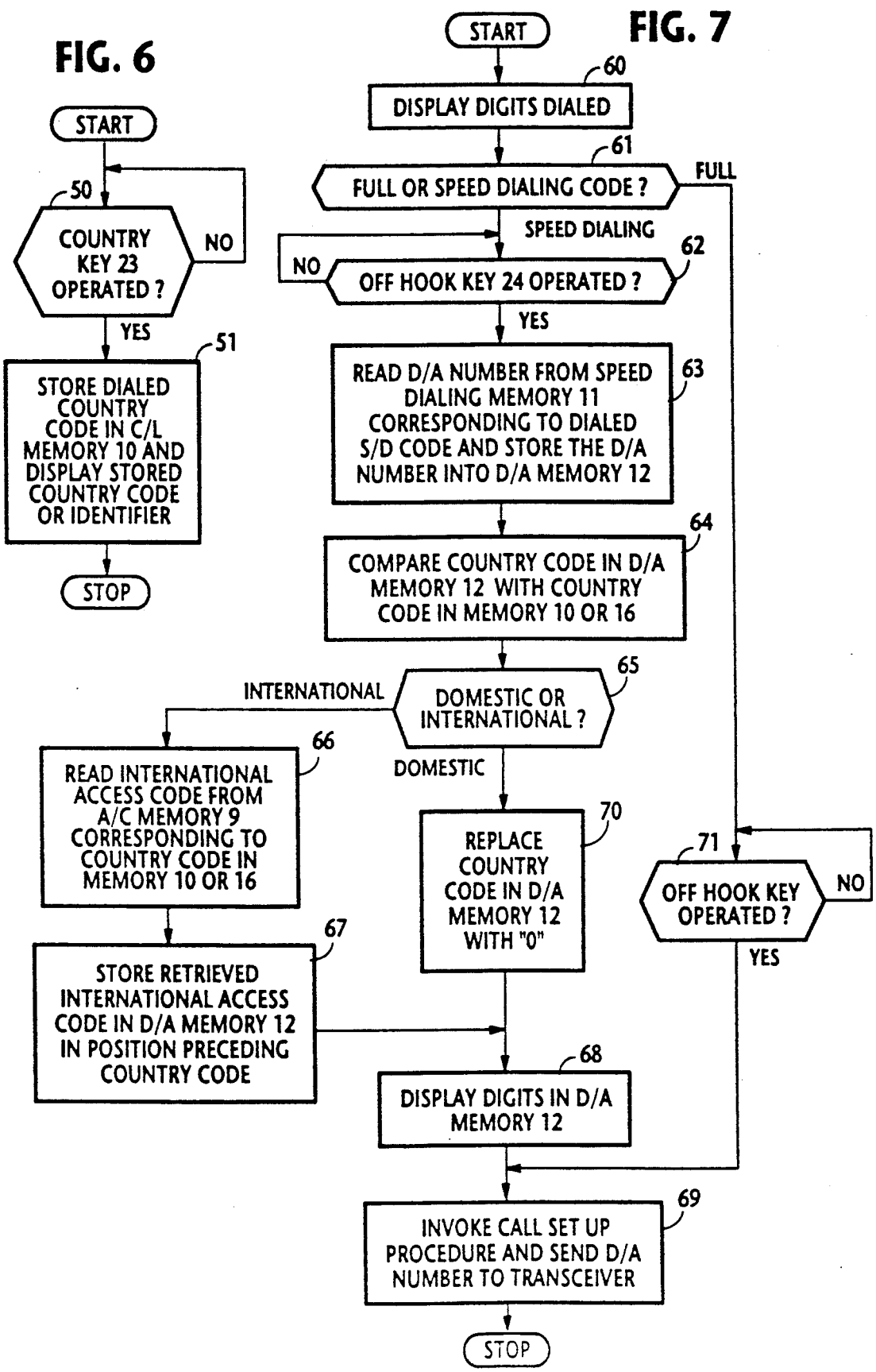

MOBILE UNIT WITH SPEED DIALING FEATURE FOR CELLULAR TELEPHONE NETWORK

BACKGROUND OF THE INVENTION

The present invention relates generally to cellular telephones, and more specifically to a mobile/personal telephone set having a speed dialing feature for originating international and domestic calls.

Speed dialing can be advantageously combined with the mobility of a cellular telephone when placing a call to one of a set of stored destinations if the location of the telephone is limited within the boundary of a country. However, if the user travels with the cellular telephone and makes an international call from a foreign country using a speed dialing feature, the speed dialing memory must be altered to append the international access code of the country in which he is travelling to a desired destination address number. In addition, when the user returns to his home country, the stored international access code must be erased from the speed dialing memory. If the user frequently moves from one country to another and makes speed dialing calls, the international access code must be altered each time he encounters a boundary between countries if these countries adopt different international access codes. Since the international access code of a country is determined solely by the national numbering plan of that country, it is usual that different international access codes are adopted by different countries. Therefore, persons traveling through different countries with a cellular phone will encounter an inconvenience, particularly when the speed dialing memory contains destinations that are resident in different countries because the international access code must be attached only to foreign-resident destinations while others are left unattached.

SUMMARY OF THE INVENTION

It is therefore an object of the present invention to provide a cellular telephone which eliminates the above-mentioned disadvantages by automatically updating destination address numbers using a call discrimination feature.

In a mobile telephone for a cellular telephone network, a speed dialing memory and a current location memory are provided, the speed dialing memory storing a plurality of destination address numbers each containing a country code, a toll area code and a telephone number, the destination address numbers being respectively identified by corresponding speed dialing codes. According to the present invention, international access codes are respectively identified by corresponding country codes and stored in an access code memory. An indication of the current location of the mobile telephone, such as a country code or a user-defined country identifier, is stored in the current location memory. A destination address number is retrieved from the speed dialing memory in response to a corresponding speed dialing code entered through a numeric keypad when a call is originated. The country code of the retrieved destination address number is compared with the indication stored in the current location memory to detect a match or a mismatch therebetween for making a first decision that the originated call is an international call if a mismatch is detected or a second decision that the originated call is a domestic call if a match is detected. In response to the first decision, an international access code is retrieved from the access code memory corresponding to the indication stored in the current location memory and the retrieved destination address number is updated by appending thereto the retrieved international access code and in response to the second decision, the retrieved destination address number is updated by replacing the country code thereof with a digit "0". The updated destination address number is then transmitted to a base station of the cellular telephone network.

BRIEF DESCRIPTION OF THE DRAWINGS

The present invention will be described in further detail with reference to the accompanying drawings, in which:

FIGS. 2 and 3 are front and side views, respectively, of the mobile telephone unit;

FIG. 4 is an illustration of a country identifier memory according to a modified embodiment of the invention;

FIG. 5 is a flowchart showing instructions programmed in the controller of FIG. 1 for storing destination address numbers corresponding to user-defined speed dialing codes;

FIG. 6 is a flowchart showing a current location registration routine programmed in the controller for making a local registration by storing a country indication code in the current location memory of FIG. 1; and FIG. 7 is a flowchart showing a call origination routine programmed in the controller for making an international or domestic call using a stored speed dialing code by automatically discriminating the originated call according to the present invention.

DETAILED DESCRIPTION

Figure 1:
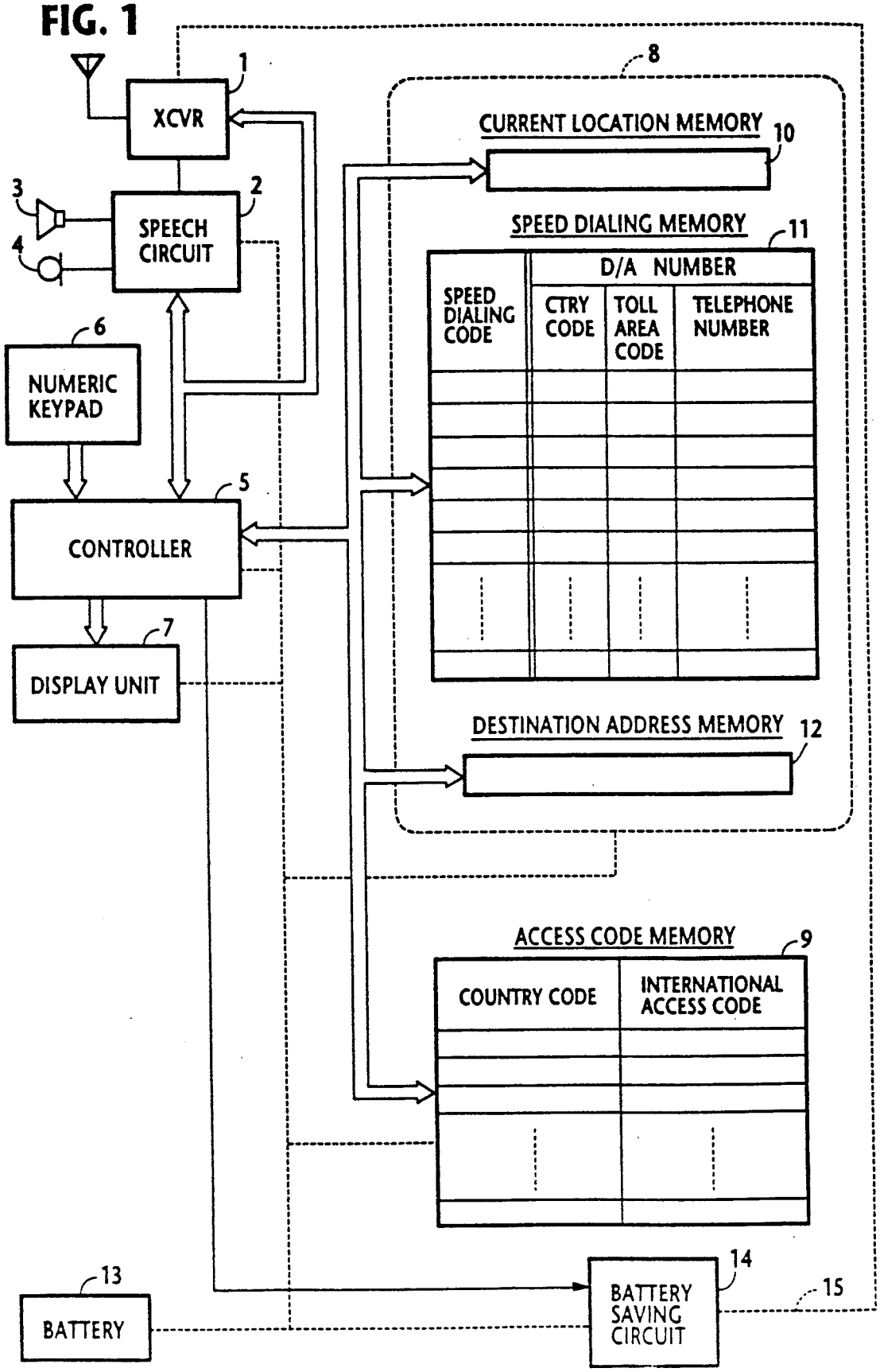
FIG. 1 is a block diagram of a mobile telephone unit of the present invention for a cellular telephone network.

Referring now to FIGS. 1, 2 and 3, there is shown a mobile (personal) telephone set of the present invention for a cellular mobile telephone network. The mobile telephone set comprises a radio transceiver 1, a speech circuit 2, a speaker 3 and a microphone 4. Radio transceiver 1 includes a frequency synthesizer, not shown, to establish a radio channel with a nearby base station located in a cell site of the network in a manner well known in the art under the control of a controller 5. Speech circuit 2 is also connected to the controller 5 for coupling the speaker 3 and microphone 4 to the transceiver 1 when the connection is established with the base station. For visually assisting the user to enter digits for purposes of speed dialing registration and current location registration which will be described later, a liquid crystal display unit 7 is connected to controller 5. Controller 5 is associated with a random access memory 8 and a read only memory 9. Random access memory 8 is partitioned into several user-definable storage areas to create a current location memory 10, a speed dialing memory 11 and a destination address memory 12. Destination address memory 12 is a temporary scratch pad memory which can be implemented by a register in the controller 5. Speed dialing memory 11 defines a map for establishing relationships between user-defined speed dialing codes and corresponding destination address numbers each containing a country code, a toll area code and a seven- or eight-digit telephone number.

The read only memory 9 is an access code memory in which a map is defined and prepared by the manufacturer or dealer for establishing relationships between the various country codes of the world and corresponding international access codes. All circuit components are housed in a hand-held casing 20 with the speaker 3 mounted on a raised portion of the casing and the display unit 7 on a side wall of the raised portion. All units directly receive DC voltage from a battery 13 except for the transceiver 1 which receives the DC power by way a battery saving circuit 14 through power line 15. Under the control of controller 5, battery saving circuit 14 periodically interrupts the DC power to the transceiver 1 during standby mode of the apparatus.

As illustrated in FIG. 4, a country identifier memory 16 is preferably created in the RAM 8 to define a map between user-defined country identifiers and corresponding internationally established country codes. With this arrangement, single-digit, easily memorable numbers can be used instead of two- or three-digit international country codes.

FIG. 5 is a flowchart in which is shown a sequence of instructions programmed into the controller 5 when the user wishes to make a speed dialing registration. The speed dialing dialcode registration program starts with decision step 30 to check to see if an asterisk key 21 on the keypad is operated. If operated, control advances to step 31 to check to see if a user-defined speed dialing code is entered. If the answer is affirmative, control moves to step 32 to display the entered speed dialing code on the display unit 7. Exit then is to step 33 to check for the operation of asterisk key 21 again. If there is one, control proceeds to step 34 to check to see if a corresponding destination address number is entered. If the destination address number is entered, it is displayed (step 35) and the operation of a #-key 22 on the keypad is checked. If this key is determined to be operated, it signifies that entry of speed dialing data is complete, and control exits to step 37 to store the entered speed dialing code and the corresponding destination address number into one of the entries of speed dialing memory 11.

In FIG. 6, it is shown that controller 5 is programmed to allow the mobile unit owner to make a registration of a country in which the unit is being used. When the user wishes to make a country registration, he operates a country key 23 on the keypad to initiate the registration (step 50). If the country identifier memory 16 is not used, the user dials the country code of the location in which the mobile unit is being used and the dialed digits are stored into the current location memory 10, with the stored country code being displayed on the display unit 7 for confirmation (step 51). The data stored in the current location memory 10 remains unchanged as long as the user is in the registered country. If the country identifier memory 16 is used, a single-digit country identifier is stored into the current location memory 10, and displayed instead of the country code (step 51).

Controller 5 is further programmed as shown in FIG. 7 to allow the mobile user to originate a call by using a destination address number stored in speed dialing memory 11 or in a full-digit mode by simply entering a full-digit destination number in the usual manner. The program execution starts with step 60 in which dialed digits entered through the keypad are displayed. Exit then is to decision step 61 to check to see if the dialed digits are a full-digit code or a speed dialing code. If a full-digit code is dialed, control branches at step 61 to step 71 to check to see if an off hook key 24 is operated. If the answer is affirmative, control branches to step 69 to invoke a call-setup routine to establish a speech channel with a base station of the network and send the dialed digits to transceiver 1.

If the dialed digits correspond to one of the speed dialing codes stored in speed dialing memory 11, control branches at step 62 to check to see if the off hook key is operated. If it is, exit then is to step 62 in which a destination address number is retrieved from the speed dialing memory 11 from a location corresponding to the dialed speed dialing code and the retrieved number is stored in the destination address memory 12.

Exit then is to step 64 to compare the country code in the destination address memory 12 with a country code to detect a match or a mismatch therebetween. If country identifier memory 16 is not used, it is compared with the country code stored in the current location memory 10, and if the memory 16 is used, it is compared with one that is stored in a position of country identifier memory 16 identified by the country code stored in memory 10. If they match, control recognizes that the call is destined to a domestic party, and if they mismatch, it recognizes that the call is an international call (step 65).

If the call is determined to be international, control branches at step 65 to step 66 to read an international access code from the access code memory 9 from a location corresponding to the country code stored in the current location memory 10. Control moves on to step 67 to store the retrieved international access code in a position of the destination address memory 12 that precedes the country code. All digits stored in the destination address memory 12 are displayed (step 68). Exit then is to step 69 to invoke the call setup procedure and send the address number in destination address memory 12 to transceiver 1. If the originated call is determined to be domestic, control branches at step 65 to step 70 to replace the country code in destination address memory 12 with a digit "0" and control exits to step 68.

It is seen that, with an appropriate country code being stored in the current location memory 10, the entry of a speed dialing code permits an international call to be originated by automatically appending an appropriate international access code to an international dialing number or permits a domestic call to be originated by automatically appending a digit "0" to a domestic (toll) dialing number.

What is claimed is:

1. A mobile telephone for a cellular telephone network, comprising:

a numeric key pad;
 a speed dialing memory;
 a current location memory;
 read/write means connected to said numeric keypad and to said speed dialing memory and said current location memory, the read/write means being responsive to digits entered from the keypad for storing destination address numbers into said speed dialing memory corresponding to speed dialing codes, and storing an indication of a current location of said mobile telephone into said current location memory, and responsive to a speed dialing code entered from said keypad when a call is originated for retrieving a corresponding destination address number from said speed dialing memory, each of the destination address numbers containing a country code, a toll area code, and a telephone number;

an access code memory storing a plurality of international access codes respectively identified by corresponding country codes;

control means for making a first decision that said originated call is an international call or a second decision that said call is a domestic call depending on whether the country code of the retrieved destination address number corresponds to the indication stored in the current location memory, said control means being responsive to said first decision for retrieving an international access code from said access code memory corresponding to the indication stored in said current location memory and updating the retrieved destination address number by appending thereto the retrieved international access code, and responsive to said second decision for updating the retrieved destination address number by replacing the country code thereof with a digit "0"; and means for transmitting the updated destination address number to a base station of the cellular telephone network.

2. A mobile telephone as claimed in claim 1, wherein said indication stored in the current location memory is a country code, aid control means including means for comparing the country code stored in said current location memory with the country code of said retrieved destination address number to make said first decision if there is a mismatch between said compared country codes and makes said second decision if there is a match between said compared country codes.

3. A mobile telephone as claimed in claim 1, further comprising a country identification memory, wherein said indication stored in the current location memory is a user defined country identifier, and said read/write means includes means for storing a plurality of country codes identified respectively by corresponding country identifiers, said control means including means for retrieving a country code from said country identification memory corresponding to the country identifier stored in said current location memory and comparing the retrieved country code with the country code of said retrieved destination address number to make said first decision if there is a mismatch between said compared country codes and makes said second decision if there is a match between said compared country codes.

4. In a mobile telephone for a cellular telephone network, the telephone comprising a numeric keypad, a speed dialing memory, and a current location memory, said speed dialing memory storing a plurality of destination address numbers each containing a country code, a toll area code and a telephone number, said destination address numbers being respectively identified by corresponding speed dialing codes, a method for making an international or domestic call comprising the steps of:

a) storing a plurality of international access codes respectively identified by corresponding country codes in an access code memory;

b) storing an indication of a current location of said mobile telephone into said current location memory;

c) retrieving a destination address number from said speed dialing memory in response to a corresponding speed dialing code entered through said keypad when a call is originated;

d) comparing the country code of the destination address number retrieved by the step (c) with the indication stored in said current location memory to detect a match or a mismatch therebetween;

e) making a first decision that said originated call is an international call if a mismatch is detected by the step (d) and making a second decision that said originated call is a domestic call if a match is detected by the step (d);

f) in response to the first decision, retrieving an international access code from said access code memory corresponding to the indication stored in said current location memory and updating the retrieved destination address number by appending thereto the retrieved international access code;

g) in response to the second decision, updating the retrieved destination address number by replacing the country code thereof with a digit "0"; and h) transmitting the updated destination address number to a base station of the cellular telephone network.

* * * * *